US008762181B1

(12) United States Patent
Ringold

(10) Patent No.: US 8,762,181 B1
(45) Date of Patent: Jun. 24, 2014

(54) SYSTEMS AND METHODS FOR EVALUATING HEALTHCARE CLAIM TRANSACTIONS FOR MEDICARE ELIGIBILITY

(75) Inventor: James Morgan Ringold, Lawrenceville, GA (US)

(73) Assignee: McKesson Financial Holdings Limited, Hamilton (BM)

( * ) Notice: Subject to any disclaimer, the term of this patent is extended or adjusted under 35 U.S.C. 154(b) by 181 days.

(21) Appl. No.: 12/650,979

(22) Filed: Dec. 31, 2009

(51) Int. Cl.
*G06Q 40/00* (2012.01)

(52) U.S. Cl.
USPC ............................................................ 705/4

(58) Field of Classification Search
CPC .............................. G06Q 40/08; G06F 19/328
USPC ........................................................ 705/2–4
See application file for complete search history.

(56) References Cited

U.S. PATENT DOCUMENTS

| 5,628,530 | A | 5/1997 | Thornton |
| 5,704,044 | A | 12/1997 | Tarter et al. |
| 6,012,035 | A | 1/2000 | Freeman et al. |
| 6,757,898 | B1 | 6/2004 | Ilsen et al. |
| 6,769,228 | B1 | 8/2004 | Mahar |
| 7,155,397 | B2 | 12/2006 | Alexander et al. |
| 7,606,721 | B1 | 10/2009 | Donnelly et al. |
| 7,617,116 | B2 | 11/2009 | Amar et al. |
| 7,739,132 | B2 | 6/2010 | Denny et al. |
| 7,752,096 | B2 * | 7/2010 | Santalo et al. ................. 705/34 |
| 7,899,688 | B2 | 3/2011 | Bonissone et al. |
| 7,917,378 | B2 | 3/2011 | Fitzgerald et al. |
| 7,983,968 | B1 | 7/2011 | Chase et al. |
| 7,996,239 | B1 | 8/2011 | Pellican et al. |
| 8,335,672 | B1 | 12/2012 | Ringold et al. |
| 2001/0027403 | A1 | 10/2001 | Peterson et al. |
| 2002/0002495 | A1 | 1/2002 | Ullman |
| 2002/0083075 | A1 * | 6/2002 | Brummel et al. ............. 707/102 |

(Continued)

FOREIGN PATENT DOCUMENTS

| CA | 2482370 | 3/2006 |
| WO | 9503569 | 2/1995 |
| WO | 0039737 | 7/2000 |
| WO | 2007025295 | 3/2007 |

OTHER PUBLICATIONS

Non-Final Office Action for U.S. Appl. No. 12/242,355 dated Nov. 9, 2010.

(Continued)

*Primary Examiner* — Sheetal R Rangrej
(74) *Attorney, Agent, or Firm* — Sutherland Asbill & Brennan LLP

(57) ABSTRACT

Systems and methods for evaluating healthcare claim transactions for Medicare eligibility are described. A healthcare claim transaction designating a payor other than a Medicare Part B payor may be received from a healthcare provider computer, and a product or service associated with the transaction may be identified as a product or service that is eligible for Medicare Part B coverage. Based at least in part on the identification, a determination may be made as to whether a patient associated with the transaction is eligible for Medicare Part B coverage. The transaction may be routed to a claims processor computer if it is determined that the patient is not eligible for Medicare Part B coverage. However, if it is determined that the patient is eligible for Medicare Part B coverage, then a message indicating that the transaction is rejected may be communicated to the healthcare provider computer.

20 Claims, 5 Drawing Sheets

(56) References Cited

U.S. PATENT DOCUMENTS

| | | | |
|---|---|---|---|
| 2002/0087583 A1 | 7/2002 | Morgan et al. | |
| 2002/0111832 A1 | 8/2002 | Judge | |
| 2002/0147616 A1* | 10/2002 | Pollard et al. | 705/3 |
| 2002/0147867 A1* | 10/2002 | Satlow | 710/100 |
| 2002/0173875 A1 | 11/2002 | Wallace et al. | |
| 2002/0188467 A1* | 12/2002 | Eke | 705/2 |
| 2002/0198831 A1 | 12/2002 | Patricelli et al. | |
| 2003/0009367 A1 | 1/2003 | Morrison | |
| 2003/0050799 A1 | 3/2003 | Jay et al. | |
| 2003/0069760 A1 | 4/2003 | Gelber | |
| 2003/0074225 A1 | 4/2003 | Borsand et al. | |
| 2003/0149625 A1 | 8/2003 | Leonardi et al. | |
| 2003/0154163 A1 | 8/2003 | Phillips et al. | |
| 2003/0171953 A1 | 9/2003 | Narayanan et al. | |
| 2003/0225595 A1 | 12/2003 | Helmus et al. | |
| 2003/0229540 A1 | 12/2003 | Algiene | |
| 2004/0039599 A1 | 2/2004 | Fralic | |
| 2004/0054685 A1 | 3/2004 | Rahn et al. | |
| 2004/0073456 A1 | 4/2004 | Gottlieb et al. | |
| 2004/0073457 A1 | 4/2004 | Kalies | |
| 2004/0078234 A1 | 4/2004 | Tallal, Jr. | |
| 2004/0117323 A1 | 6/2004 | Mindala | |
| 2004/0148198 A1 | 7/2004 | Kalies | |
| 2004/0230502 A1 | 11/2004 | Fiacco et al. | |
| 2004/0249745 A1 | 12/2004 | Baaren | |
| 2005/0015280 A1 | 1/2005 | Gabel et al. | |
| 2005/0060201 A1 | 3/2005 | Connely et al. | |
| 2005/0102169 A1 | 5/2005 | Wilson | |
| 2005/0154627 A1 | 7/2005 | Zuzek et al. | |
| 2005/0187793 A1* | 8/2005 | Myles | 705/2 |
| 2005/0197862 A1 | 9/2005 | Paterson et al. | |
| 2005/0240473 A1 | 10/2005 | Ayers | |
| 2005/0288964 A1 | 12/2005 | Lutzen et al. | |
| 2005/0288972 A1 | 12/2005 | Marvin et al. | |
| 2006/0020514 A1 | 1/2006 | Yered | |
| 2006/0026041 A1 | 2/2006 | Ullman et al. | |
| 2006/0080139 A1* | 4/2006 | Mainzer | 705/2 |
| 2006/0080146 A1 | 4/2006 | Cook et al. | |
| 2006/0149784 A1 | 7/2006 | Tholl et al. | |
| 2006/0184391 A1 | 8/2006 | Barre et al. | |
| 2006/0259363 A1 | 11/2006 | Jhetam | |
| 2007/0005402 A1 | 1/2007 | Kennedy et al. | |
| 2007/0050209 A1 | 3/2007 | Yered | |
| 2007/0050219 A1 | 3/2007 | Sohr | |
| 2007/0136100 A1 | 6/2007 | Daugherty et al. | |
| 2007/0233525 A1 | 10/2007 | Boyle | |
| 2007/0233526 A1 | 10/2007 | Hoffman et al. | |
| 2007/0239493 A1 | 10/2007 | Sweetland et al. | |
| 2007/0260646 A1 | 11/2007 | Szlam | |
| 2007/0276697 A1 | 11/2007 | Wiley, II et al. | |
| 2007/0282637 A1 | 12/2007 | Smith | |
| 2008/0288281 A1* | 11/2008 | Shell et al. | 705/2 |
| 2008/0306952 A1 | 12/2008 | Lynn et al. | |
| 2009/0198518 A1 | 8/2009 | McKenzie et al. | |
| 2009/0326974 A1 | 12/2009 | Tolan et al. | |
| 2010/0161351 A1* | 6/2010 | Howe et al. | 705/3 |
| 2011/0029321 A1 | 2/2011 | Rourke et al. | |
| 2012/0173258 A1 | 7/2012 | Hofmann et al. | |

OTHER PUBLICATIONS

Non-final Office Action for U.S. Appl. No. 12/259,889 dated Sep. 8, 2011.

Final Office Action for U.S. Appl. No. 12/242,335 mailed Apr. 26, 2010.

Sampson, R.J., Taking Control of Health Care Costs, Best's Review—Life Health Insurance Edition, Nov. 1983, pp. 64-66, vol. 84, Issue 7, USA.

Anonymous, ACS to Demonstrate Electronic Health Record Solution Suite at MMIS 2007 Conference; EHR Tools Consolidate Data, Provide Useful Information at the Point of Care for Medicaid Providers, Payers, and Patients, PR Newswire, Aug. 13, 2007, New York, NY, USA.

Lamb, J., New Era of Electronic Medicine Management: E-Prescriptions, Britain's Traditionally Cautious National Health Service is Starting Trials for Online Prescription, with the Aim of Cutting Costs. Financial Times, London, Feb. 21, 2001, p. 6, London, United Kingdom.

Anonymous, Pharmacy Industry Leaders Launch Firm to Supply Real-Time Data. PR Newswire. Jul. 30, 2001, p. 1, New York, NY, USA.

Anonymous, Medic: On-line Goes In-House, Chain Store Age Executive, Jan. 1987, pp. 128-132. vol. 63, Issue 1, USA.

Anonymous, TechRx Announces Successful Beta Deployment of T-Rex. PR Newswire. May 13, 2002.

Final Office Action for U.S. Appl. No. 12/259,889, mailed Dec. 14, 2011.

Non-final Office Action for U.S. Appl. No. 12/732,770 mailed Dec. 22, 2011.

Notice of Allowance for U.S. Appl. No. 12/732,770 mailed Aug. 20, 2012.

Final Office Action for U.S. Appl. No. 12/978,845 mailed Apr. 26, 2013.

Final Office Action for U.S. Appl. No. 13/276,017 mailed Jun. 12, 2013.

Final Office Action for U.S. Appl. No. 12/259,889 mailed Aug. 9, 2013.

Non-Final Office Action for U.S. Appl. No. 13/348,217 mailed Aug. 28, 2013.

Final Office Action for U.S. Appl. No. 12/732,770 mailed Mar. 28, 2012.

Non-Final Office Action for U.S. Appl. No. 12/259,889 mailed Jun. 15, 2012.

Non-Final Office Action for U.S. Appl. No. 13/726,017 mailed Dec. 26, 2012.

Non-Final Office Action for U.S. Appl. No. 12/259,889 mailed Jan. 23, 2013.

CMS, "Draft Transition Process Requirements for Part D Sponsors" Feb. 2006.

CMS, "Revised Guidance for Prescription Drug Event Record Changes Required to close the coverage gap" Jul. 9, 2010.

Cigna, "Rxesource" Dec. 22, 2010.

Caremark Medicare, "Pharmacy Update" Dec. 16, 2010.

CMS, "Transition Process Requirements for Part D Sponsors" Apr. 2006.

Cigna Pharmacy Archive Website as downloaded Feb. 4, 2013.

CMS, "Reminder of the Part D Transition Policy" Mar. 25, 2010.

Non-Final Office Action for U.S. Appl. No. 12/978,845 mailed Feb. 7, 2013.

Final Office Action for U.S. Appl. No. 13/348,217 mailed Dec. 19, 2013.

Non-Final Office Action for U.S. Appl. No. 13/607,264 mailed Feb. 21, 2014.

* cited by examiner

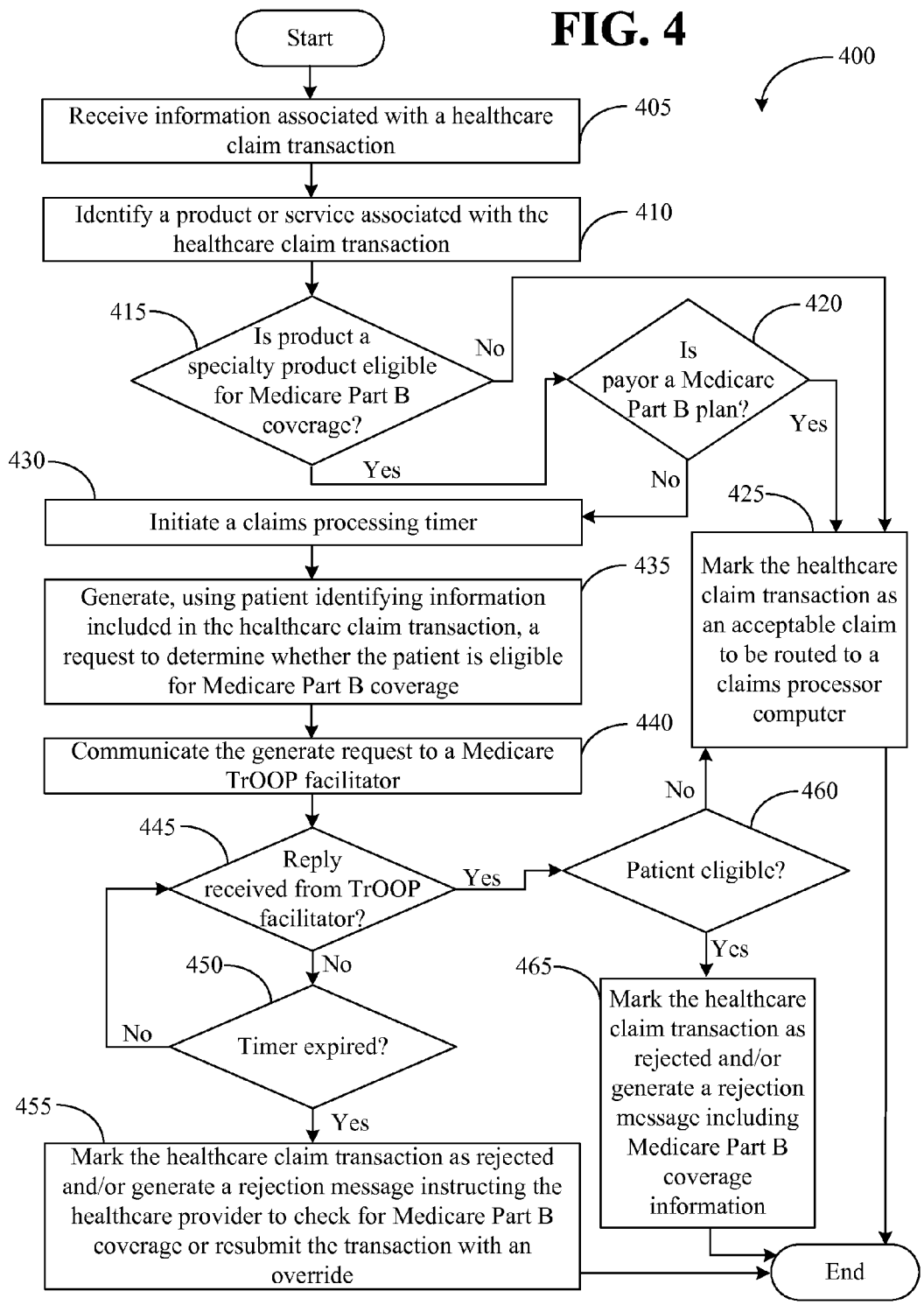

SYSTEMS AND METHODS FOR EVALUATING HEALTHCARE CLAIM TRANSACTIONS FOR MEDICARE ELIGIBILITY

FIELD OF THE INVENTION

Aspects of the invention relate generally to healthcare transactions, and more particularly, to evaluating or processing healthcare claim transactions for Medicare eligibility.

BACKGROUND OF THE INVENTION

Healthcare providers, such as pharmacies, physicians, and/or hospitals, often generate healthcare claims or healthcare claim transactions that are communicated to appropriate claims processors or payors, such as insurance providers or government payors. In the majority of circumstances, a Medicare program is utilized as a payor of last resort after other available payors, such as commercial insurance programs, have been billed. However, certain specialty products or services, such as immunosuppressant drugs, may be eligible for certain Medicare coverage without first billing other available payors. More specifically, Medicare Part B plans may be billed first for patients that are eligible for Medicare Part B coverage.

Healthcare providers are often unaware of a patient's Medicare Part B eligibility. Additionally, patients may not be aware of their Medicare Part B eligibility, much less the products and services that are covered by Medicare Part B. As a result, commercial insurance plans or other commercial payors are often billed first for products or services that are eligible for Medicare Part B coverage. As a result, commercial payors may generate charge-backs at a later point in time for certain products and/or services. It is often difficult for healthcare providers to recoup funds for these incorrectly billed healthcare claim transactions. Accordingly, the charge-backs may lead to substantial lost revenue on the part of the healthcare providers.

Therefore, a need exists for systems and methods for evaluating healthcare claim transactions for Medicare eligibility.

BRIEF DESCRIPTION OF THE INVENTION

Some or all of the above needs and/or problems may be addressed by certain embodiments of the invention. Embodiments of the invention may include systems, methods, and apparatus for evaluating healthcare claim transactions for Medicare eligibility. In one embodiment, a computer-implemented method for evaluating healthcare claim transactions for Medicare eligibility may be provided. A healthcare claim transaction for a patient may be received from a healthcare provider computer. The healthcare claim transaction may designate a payor other than a Medicare Part B payor. A product or service associated with the healthcare claim transaction may be identified as a product or service that is eligible for Medicare Part B coverage. Based at least in part on the identification, a determination may be made as to whether the patient is eligible for Medicare Part B coverage. The healthcare claim transaction may be routed to a claims processor computer if it is determined that the patient is not eligible for Medicare Part B coverage. If it is determined that the patient is eligible for Medicare Part B coverage, then a message indicating that the healthcare claim transaction is rejected may be communicated to the healthcare provider computer. In certain embodiments, the above operations are performed by one or more computers associated with a service provider.

In accordance with another embodiment of the invention, a system for evaluating healthcare claim transactions for Medicare eligibility may be provided. The system may include at least one memory, and at least one processor. The at least one memory may be operable to store computer-executable instructions. The at least one processor may be configured to access the at least one memory and execute the computer-executable instructions to: receive, from a healthcare provider computer, a healthcare claim transaction for a patient, wherein the healthcare claim transaction designates a payor other than a Medicare Part B payor; identify a product or service associated with the healthcare claim transaction as a product or service that is eligible for Medicare Part B coverage; determine, based at least in part on the identification, whether the patient is eligible for Medicare Part B coverage; and route the healthcare claim transaction to a claims processor computer if it is determined that the patient is not eligible for Medicare Part B coverage; or communicate, to the healthcare provider computer if it is determined that the patient is eligible for Medicare Part B coverage, a message indicating that the healthcare claim transaction is rejected.

Additional systems, methods, apparatus, features, and aspects may be realized though the techniques of various embodiments of the invention. Other embodiments and aspects of the invention are described in detail herein with reference to the description and to the drawings and are considered a part of the claimed invention.

BRIEF DESCRIPTION OF THE DRAWINGS

Reference will now be made to the accompanying drawings, which are not necessarily drawn to scale, and wherein:

FIG. 4 is a flow chart of an example method for determining whether a product or service associated with a healthcare claim transaction is eligible for Medicare Part B coverage, according to an illustrative embodiment of the invention.

DETAILED DESCRIPTION

Embodiments of the invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Embodiments of the invention may include systems, methods, and apparatus for evaluating healthcare claim transactions for Medicare eligibility. Healthcare claim transactions that designate payors other than a Medicare Part B payor may be evaluated in order to identify one or more products or services that are potentially eligible for Medicare Part B coverage. If a relevant or eligible product or service is identified for a claim transaction, then a determination may be made as to whether a patient associated with or identified by the transaction is eligible for Medicare Part B coverage. For example, a Medicare eligibility file, such as an eligibility file maintained by a True Out-of-Pocket (TrOOP) facilitator, may be searched for patient identifying information that matches or otherwise corresponds to patient identifying information included in the healthcare claim transaction. If it is determined that the patient is not eligible for Medicare Part B coverage, then the healthcare claim transaction may be routed to an appropriate claims processor computer associated with the designated payor. However, if it is determined that the patient is eligible for Medicare Part B coverage, then a message indicating that the healthcare claim transaction is rejected may be communicated to the healthcare provider computer. As desired, the message may include an indication that certain products or services included in the transaction are eligible for Medicare Part B coverage and/or an instruction to resubmit the transaction and designate Medicare Part B as the payor for the transaction. Additionally, information associated with the patient's Medicare Part B eligibility or available coverage may be included in the message as desired. In this regard, incorrect or inappropriate billing to commercial payors may be reduced or avoided in situations where Medicare coverage is available. Additionally, charge-backs for relatively expensive products and services may be reduced or avoided.

System Overview

Figure 1:
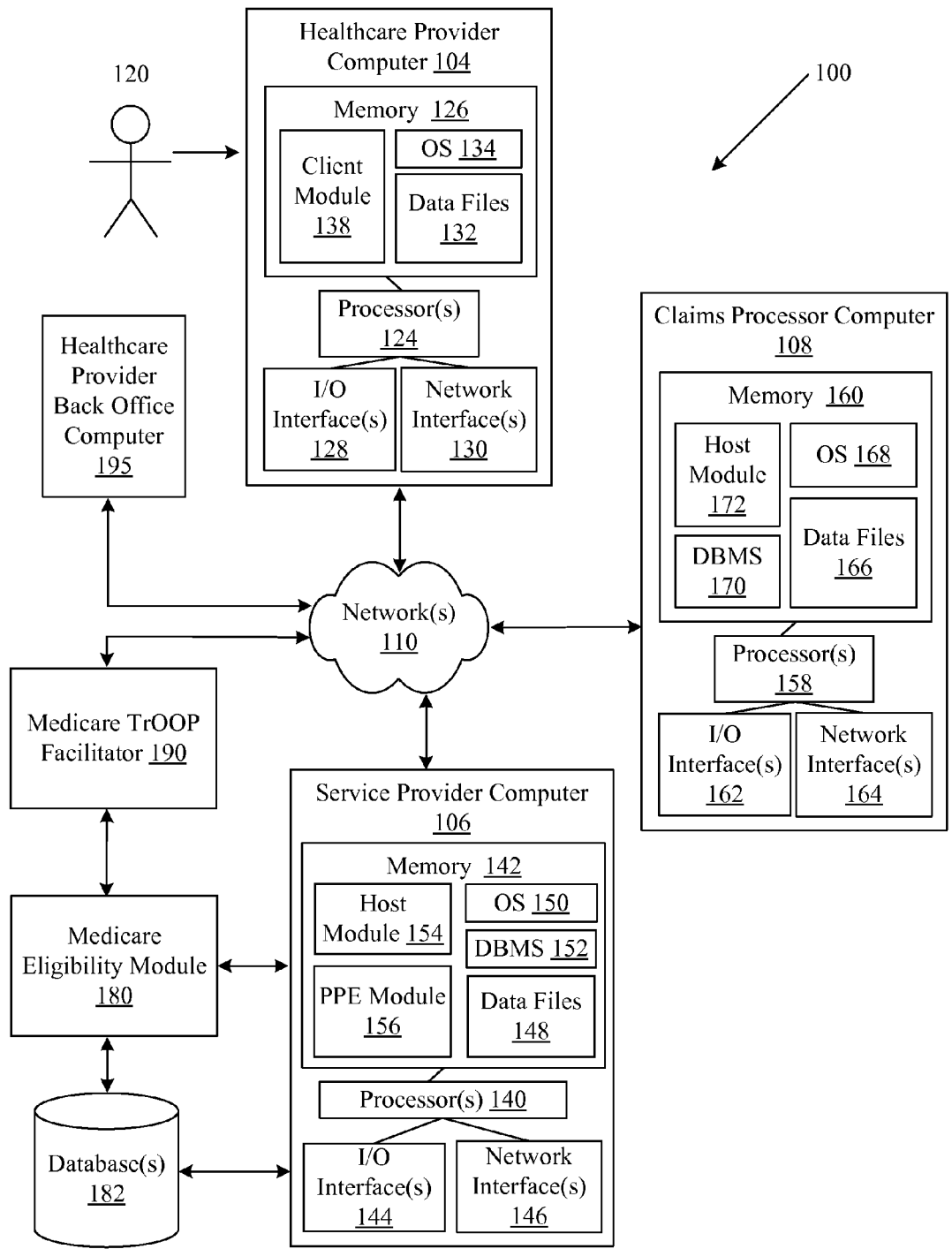
FIG. 1 illustrates an example overview of a system that facilitates the evaluation of healthcare claim transactions for Medicare eligibility, according to an example embodiment of the invention.

An example system 100 that facilitates the evaluation of healthcare claim transactions for Medicare eligibility will now be described illustratively with respect to FIG. 1. As shown in FIG. 1, the system 100 may include at least one healthcare provider computer 104, at least one service provider computer 106, and at least one claims processor computer 108. As desired, each of the healthcare provider computer 104, service provider computer 106, and/or claims processor computer 108 may include one or more processing devices that may be configured for accessing and reading associated computer-readable media having stored thereon data and/or computer-executable instructions for implementing the various methods of the invention.

Additionally, in certain embodiments, the service provider computer 106 may include or otherwise be in communication with a Medicare eligibility module 180 or Medicare eligibility application, which may access and/or be in communication with one or more suitable data storage devices, 182. The Medicare eligibility module 180 may receive information associated with healthcare claim transactions, and the Medicare eligibility module 180 may identify a drug, other product, or service associated with the received healthcare claim transaction. In certain embodiments, information associated with a healthcare claim transaction may be processed or evaluated by the Medicare eligibility module 180 when a designated payor for the transaction is not a Medicare payor, such as a Medicare Part B payor. In other embodiments, the Medicare eligibility module 180 may identify a designated payor and perform additional processing if the identified payor is not a Medicare payor.

The Medicare eligibility module 180 may determine whether an identified drug, product, or service is eligible for Medicare Part B coverage. If a product or service is eligible for Medicare Part B coverage, then the Medicare eligibility module 180 may determine whether a patient associated with the healthcare claim transaction is eligible for Medicare Part B coverage. For example, patient identifying information included in the healthcare claim transaction may be compared to patient information included in a Medicare eligibility file, and the patient may be identified as a Medicare eligible patient if a match is found. If it is determined that the patient is eligible for Medicare Part B coverage, then the healthcare claim transaction may be rejected in order to facilitate resubmission of the transaction with a Medicare payor designated as an appropriate payor. In this regard, claim transactions that include an improper commercial payor when Medicare should be designated as the payor will not be routed or otherwise communicated to a claims processor computer. Additionally, as desired, the Medicare eligibility module 180 may facilitate reporting and/or billing for the processing and/or evaluation conducted by the module 180.

Generally, network devices and systems, including one or more of the healthcare provider computer 104, service provider computer 106, and claims processor computer 108 may include or otherwise be associated with suitable hardware and/or software for transmitting and receiving data and/or computer-executable instructions over one or more communications links or networks. These network devices and systems may also include any number of processors for processing data and executing computer-executable instructions, as well as other internal and peripheral components that are well known in the art. Further, these network devices and systems may include or be in communication with any number of suitable memory devices operable to store data and/or computer-executable instructions. By executing computer-executable instructions, each of the network devices may form a special purpose computer or particular machine. As used herein, the term "computer-readable medium" describes any form of suitable memory or memory device.

As shown in FIG. 1, the healthcare provider computer 104, service provider computer 106, and claims processor computer 108 may be in communication with each other via one or more networks, such as network 110, which as described below can include one or more separate or shared private and public networks, including the Internet or a publicly switched telephone network. Each of these components—the healthcare provider computer 104, service provider computer 106, and claims processor computer 108, and the network 110—will now be discussed in further detail.

The healthcare provider computer 104 may be associated with a healthcare provider, for example, a pharmacy, physician's office, hospital, etc. In certain embodiments, the healthcare provider may be associated with a group of healthcare providers, such as a pharmacy chain. The healthcare provider computer 104 may be any suitable processor-driven device that facilitates the processing of healthcare requests made by patients or consumers and the communication of information associated with healthcare claim transactions to the service provider computer 106, such as a server computer, a mainframe computer, one or more networked computers, a desktop computer, a personal computer, a digital assistant, a personal digital assistant, a digital tablet, an Internet appliance, an application specific circuit, microcontroller, minicomputer, or any other processor-based device. In certain embodiments, the healthcare provider computer 104 may be a suitable point of sale device associated with a healthcare provider. The execution of the computer-implemented instructions by the healthcare provider computer 104 may form a special purpose computer or other particular machine that is operable to facilitate the processing of healthcare requests made by patients and the communication of information associated with healthcare claim transactions to a service provider computer 106. Additionally, in certain embodiments of the invention, the operations and/or control of the healthcare provider computer 104 may be distributed amongst several processing components.

In addition to having one or more processors 124, the healthcare provider computer 104 may include one or more memory devices 126, one or more input/output ("I/O") interface(s) 128, and one or more network interface(s) 130. The memory devices 126 may be any suitable memory devices, for example, caches, read only memory devices, random access memory devices, magnetic storage devices, removable storage devices, etc. The memory devices 126 may store data, executable instructions, and/or various program modules utilized by the healthcare provider computer 104, for example, data files 132, an operating system 134, and/or a client module 138. The data files 132 may include any suitable data that facilitates the receipt and/or processing of healthcare requests by the healthcare provider computer 104 and the generation and/or processing of healthcare claim transactions that are communicated to the service provider computer 106. For example, the data files 132 may include, but are not limited to, healthcare information and/or contact information associated with one or more patients, information associated with the service provider computer 106, information associated with one or more claims processors, and/or information associated with one or more healthcare claim transactions. The operating system (OS) 134 may be a suitable software module that controls the general operation of the healthcare provider computer 104. The OS 134 may also facilitate the execution of other software modules by the one or more processors 124, for example, the client module 138. The OS 134 may be, but is not limited to, Microsoft Windows®, Apple OSX™, Linux, Unix, or a mainframe operating system. The client module 138 may be an Internet browser or other software, including a dedicated program, for interacting with the service provider computer 106. For example, a user 120 such as a pharmacist or other pharmacy employee, may utilize the client module 138 in preparing and providing a prescription claim request to the service provider computer 106 for delivery to the appropriate claims processor computer 108 for adjudication or other coverage/benefits determination. The healthcare provider computer 104 may also utilize the client module 138 to retrieve or otherwise receive data, messages, or responses from the service provider computer 106 and/or other components of the system 100.

In operation, the healthcare provider computer 104 may receive information associated with a healthcare request for a patient. As one example, the healthcare provider computer 104 may receive a healthcare request for a patient at a point of sale, such as in a pharmacy during a prescription fulfillment or at a physician's office during the provision of a healthcare service. As another example, the healthcare provider computer 104 may electronically receive a healthcare request from a patient computer or other patient device. The healthcare provider computer 104 may generate a healthcare claim transaction for the request and information associated with the healthcare claim transaction may be communicated to the service provider computer 106. In various embodiments of the invention, a generated or prepared healthcare claim transaction or prescription claim request may include claims for one or more products or services that are to be submitted to a payor or claims processor other than a Medicare payor.

The one or more I/O interfaces 128 may facilitate communication between the healthcare provider computer 104 and one or more input/output devices, for example, one or more user interface devices, such as, a display, keypad, control panel, touch screen display, remote control, microphone, etc. that facilitate user interaction with the healthcare provider computer 104. For example, the one or more I/O interfaces 128 may facilitate entry of information associated with a healthcare transaction or healthcare claim request by an employee 120 of a healthcare provider, such as a pharmacy employee. The one or more network interfaces 130 may facilitate connection of the healthcare provider computer 104 to one or more suitable networks, for example, the network 110 illustrated in FIG. 1. In this regard, the healthcare provider computer 104 may receive and/or communicate information to other network components of the system 100, such as the service provider computer 106.

With continued reference to FIG. 1, the service provider computer 106 may include, but is not limited to, any suitable processor-driven device that is configured for receiving, processing, and fulfilling requests from the healthcare provider computer 104 and/or the claims processor computer 108 relating to prescription, pharmacy, benefits, and/or healthcare transactions and/or other activities. In certain embodiments, the service provider computer 106 may be a switch/router that routes healthcare claim transactions and/or other healthcare requests. For example, the service provider computer 106 may route billing requests and/or prescription claim requests communicated from the healthcare provider computer 104 to a claims processor computer 108, such as a pharmacy benefits manager (PBM), an insurer, a Medicare payor, another government payor, or a claims clearinghouse. In certain embodiments, the service provider computer 106 may include a suitable host server, host module, or other software that facilitates the receipt of a healthcare claim transaction from a healthcare provider computer 104 and/or the routing of the received healthcare claim transaction to a claims processor computer 108. Any number of healthcare provider computers and/or claims processor computers may be in communication with the service provider computer 106 as desired in various embodiments of the invention.

The service provider computer 106 may include any number of special purpose computers or other particular machines, application specific circuits, microcontrollers, personal computers, minicomputers, mainframe computers, servers, networked computers, and/or other processor-driven devices. In certain embodiments, the operations of the service provider computer 106 may be controlled by computer-executed or computer-implemented instructions that are executed by one or more processors associated with the service provider computer 106 to form a special purpose computer or other particular machine that is operable to facilitate the receipt, routing, and/or processing of healthcare claim transactions. The one or more processors that control the operations of the service provider computer 106 may be incorporated into the service provider computer 106 and/or in communication with the service provider computer 106 via one or more suitable networks. In certain embodiments of the invention, the operations and/or control of the service provider computer 106 may be distributed amongst several processing components.

Similar to the healthcare provider computer 104, the service provider computer 106 may include one or more processors 140, one or more memory devices 142, one or more input/output ("I/O") interface(s) 144, and one or more network interfaces 146. The one or more memory devices 142 may be any suitable memory devices, for example, caches, read only memory devices, random access memory devices, magnetic storage devices, removable memory devices, etc. The one or more memory devices 142 may store data, executable instructions, and/or various program modules utilized by the service provider computer 106, for example, data files 148, an operating system ("OS") 150, the host module 154, a pre- and post-edit (PPE) module 156, and a database management system ("DBMS") 152 to facilitate management of data files 148 and other data stored in the memory devices 142 and/or one or more databases 182. The OS 150 may be, but is not limited to, Microsoft Windows®, Apple OSX™, Linux, Unix, or a mainframe operating system. The OS 150 may be a suitable software module that controls the general operation of the service provider computer 106 and/or that facilitates the execution of other software modules.

The PPE module 156 may be operable to perform one or more pre-edits on a received healthcare claim transaction prior to routing or otherwise communicating the received healthcare claim transaction to a suitable claims processor computer 108. Additionally, the PPE module 156 may be operable to perform one or more post-edits on an adjudicated reply or response that is received from a claims processor computer 108 for a healthcare claim transaction prior to routing the adjudicated reply to the healthcare provider computer 104. A wide variety of different pre-edits and/or post-edits may be performed as desired in various embodiments of the invention. In certain embodiments, the Medicare eligibility module 180 may be incorporated into the PPE module 156 and/or in communication with the PPE module 156.

According to an embodiment of the invention, the data files 148 may store healthcare transaction records associated with communications received from various healthcare provider computers 104 and/or various claims processor computers 108. The data files 148 may also store any number of suitable routing tables that facilitate determining the destination of communications received from a healthcare provider computer 104 or claims processor computer 108. The host module 154 may receive, process, and respond to requests from the client module 138 of the healthcare provider computer 104, and may further receive, process, and respond to requests of the host module 172 of the claims processor computer 108. The service provider computer 106 may include additional program modules for performing other processing methods described herein. Those of ordinary skill in the art will appreciate that the service provider computer 106 may include alternate and/or additional components, hardware or software without departing from example embodiments of the invention.

A Medicare eligibility module 180 or Medicare eligibility application may also be operative with the service provider computer 106. The Medicare eligibility module 180 may include computer-executable instructions for processing healthcare claim transactions in order to determine whether a claim for one or more products or services should be routed or otherwise communicated to a Medicare payor, such as a Medicare Part B payor. In other words, the Medicare eligibility module 180 may determine whether a designated payor for a healthcare claim transaction is a proper payor for the transaction. In certain embodiments, the Medicare eligibility service performed by the Medicare eligibility module 180 may be a pre-edit service that is performed for a healthcare claim transaction. If a Medicare eligibility service is enabled for a healthcare provider associated with the healthcare provider computer 104, then the Medicare eligibility module 180 may process a received healthcare claim transaction in order to evaluate product and payor information.

As desired, the operations of the Medicare eligibility module 180 may include an identification of a designated payor. For example, in certain embodiments, the Medicare eligibility module 180 may identify a designated payor and perform additional processing if the identified payor is not a Medicare payor. Alternatively, in certain embodiments, the invocation of the Medicare eligibility module 180 may be dependent upon an identification of a designated payor. For example, information associated with a healthcare claim transaction may be processed or evaluated by the Medicare eligibility module 180 when a designated payor for the transaction has been determined to be a payor other than a Medicare payor, such as a Medicare Part B payor.

In operation, the Medicare eligibility module 180 may receive information associated with healthcare claim transactions, and the Medicare eligibility module 180 may identify a drug, other product, or service associated with the received healthcare claim transaction. The Medicare eligibility module 180 may then determine whether an identified drug, product, or service is eligible for Medicare Part B coverage. For example, the Medicare eligibility module 180 may identify products and/or services by suitable identifiers, such as National Drug Code (NDC) identifiers or Universal Product Code (UPC) identifiers, and the Medicare eligibility module 180 may determine whether the identifiers match one or more stored identifiers associated with Medicare eligible products.

If no identified products or services are available for Medicare Part B coverage, then the Medicare eligibility module 180 may mark the healthcare claim transaction as an acceptable transaction that may be routed or otherwise communicated to a designated payor. However, if it is determined that a product or service is eligible for Medicare Part B coverage, then the Medicare eligibility module 180 may identify a patient associated with the healthcare claim transaction, and the Medicare eligibility module 180 may determine whether the patient is eligible for Medicare Part B coverage. For example, patient identifying information may be extracted from or otherwise identified from the healthcare claim transaction, and the patient identifying information may be compared to patient information that is stored in a Medicare eligibility file or a Medicare eligibility database. If a match is found, then it may be determined that the patient is eligible for Medicare Part B coverage and that the designated payor for the healthcare claim transaction should be a Medicare payor. As desired, the patient identifying information included in the transaction may be normalized prior to making a comparison. In certain embodiments, the Medicare eligibility module 180 may access a relevant Medicare eligibility file and compare at least a portion of the accessed information stored in the eligibility file to at least a portion of the patient identifying information included in the healthcare claim transaction. In other embodiments, the Medicare eligibility module 180 may utilize patient identifying information included in the healthcare claim transaction to generate a request or eligibility transaction (also known as an E1 transaction) to determine whether the patient is eligible for Medicare Part B coverage, and the generated request may be communicated to an appropriate entity that has access to Medicare eligibility information, for example, a suitable Medicare True Out-of-Pocket (TrOOP) facilitator 190. In certain embodiments, the request may be communicated via a direct communications link with the TrOOP facilitator 190 from the Medicare eligibility module 180 or the service provider computer 106. In other embodiments, the request may be communicated via one or more suitable networks, such as network 110. A reply to the generated request may be received by the Medicare eligibility module 180, and the reply may be analyzed to determine whether the patient is eligible for Medicare Part B coverage.

If it is determined that the patient is not eligible for Medicare Part B coverage, then the Medicare eligibility module 180 may mark the healthcare claim transaction as an acceptable transaction that may be routed or otherwise communicated to a designated payor. However, if the Medicare eligibility module 180 determines that the patient is eligible for Medicare Part B coverage, then the Medicare eligibility module 180 may trigger or generate a rejection for the healthcare claim transaction. As desired, the Medicare eligibility module 180 may generate an appropriate rejection message indicating that an inappropriate payor has been designated for the healthcare claim transaction and that the designated payor should be a Medicare Part B payor. In certain embodiments, the rejection message may include Medicare Part B coverage information for the patient and/or an instruction or invitation to resubmit the healthcare claim transaction with a designation of a Medicare Part B payor as an appropriate payor. Additionally, as desired, the rejection message may include generated or accessed override information, such as an override code, that may be utilized by a healthcare provider to override the Medicare eligibility service during a resubmission of the healthcare claim transaction. For example, if the healthcare provider determines that the payor designated in the healthcare claim transaction is an appropriate payor notwithstanding Medicare eligibility of the patient, then the Medicare eligibility edit or service may be overridden by the healthcare provider. The Medicare eligibility module 180 may then communicate or direct the communication of the generated message to the healthcare provider computer 104.

As an alternative to generating a rejection message, in certain embodiments, the Medicare eligibility module 180 may alter the designated payor for the healthcare claim transaction to a Medicare Part B payor. The Medicare eligibility module 180 may then direct the routing or other communication of the altered healthcare claim transaction to a suitable claims processor computer associated with a Medicare payor. As desired, the Medicare eligibility module 180 may then generate a message indicating the change of designated payors and direct the communication of the generated message to the healthcare provider computer 104 and/or to a healthcare provider back office computer 195 in order to facilitate proper record keeping by the healthcare provider.

In certain embodiments, the Medicare eligibility module 180 may identify one or more rules or parameters that are applicable for processing a healthcare claim transaction. For example, the Medicare eligibility module 180 may identify one or more applicable rules or parameters based upon an identity of the healthcare provider that submitted the claim transaction or a group of healthcare providers (e.g., a pharmacy chain) in which the healthcare provider is included. The identified rules may include rules associated with various edits and/or processing steps to be performed on a healthcare claim transaction by the Medicare eligibility module 180. For example, the identified rules may include timing thresholds or timing windows for processing healthcare claim transactions and/or for communicating requests to a TrOOP facilitator 190. As another example, the identified rules may include rules associated with the generation of rejection messages and/or the altering of healthcare claim transactions in order to change a designated payor. As yet another example, the identified rules may include rules associated with certain products or services that should be exempted from the processing performed by the Medicare eligibility module 180.

Additionally, as desired, the Medicare eligibility module 180 may store or direct the storage of information associated with the healthcare claim transaction in the data storage devices 182. For example, the Medicare eligibility module 180 may store the healthcare claim transaction, information extracted from the healthcare claim transaction, information associated with the rules applied to the healthcare claim transaction, information associated with the results of the processing or evaluation of the healthcare claim transaction, information associated with identified or triggered rejections, and/or information associated with altered or modified healthcare claim transactions. In certain embodiments, the stored information may be utilized for billing and/or reporting purposes.

The data storage devices 182 may be operable to store information associated with various rules and/or edits that may be utilized by the Medicare eligibility module 180 to process healthcare claim transactions. For example, rules may be received from one or more other components of the system 100, such as the healthcare provider computer 104, the healthcare provider back office computer 195, and/or the claims processor computer 108, and at least a portion of the received rules may be stored. Additionally, the data storage devices 182 may be operable to store information associated with healthcare claim transactions and/or processing performed by the Medicare eligibility module 180. In certain embodiments, the data storage devices 182 may additionally store billing information associated with the healthcare claim transactions and/or reports associated with the healthcare claim transactions and/or processing of the healthcare claim transactions. The data storage devices 182 may be accessible by the Medicare eligibility module 180 and/or the service provider computer 106.

In certain embodiments, the Medicare eligibility module 180 and/or the service provider computer 106 may be operable to generate one or more reports associated with processed healthcare claim transactions. A wide variety of different types of reports may be generated as desired in various embodiments of the invention. Additionally, a wide variety of different information may be incorporated into generated reports, including but not limited to, a number of times the Medicare eligibility module 180 was invoked for a healthcare provider or group of healthcare providers (e.g., a pharmacy chain), information associated with the results of various processing performed by the Medicare eligibility module 180, date information and/or date range information associated with the processed healthcare claim transactions, financial information associated with the healthcare claim transactions, and/or billing information associated with the invocation of the Medicare eligibility module 180 for the healthcare claim transactions. Reports may be sorted or formatted utilizing a wide variety of different criteria, parameters, and/or techniques. Additionally, the Medicare eligibility module 180 may communicate or direct the communication of generated reports to one or more other components of the system, for example, the healthcare provider computer 104 and/or a healthcare provider back office computer 195 associated with a group of healthcare providers.

A wide variety of different techniques and/or software programs may be utilized to format a generated report. For example, a report may be formatted as a comma-separated-value (csv) file, as a spreadsheet file, as a word processor file, as a text file, etc. Additionally, a wide variety of different communication techniques may be utilized to communicate a report to the recipient including, but not limited to, email, short message service (SMS) messaging, other electronic communications, snail mail, etc. A report may be pushed to a recipient by the Medicare eligibility module 180 or other reporting module, or, alternatively pulled from the Medicare eligibility module 180 by a recipient submitting a request for one or more reports. Additionally, in certain embodiments, a report may be made available for download from an appropriate web site or server, such as a web site hosted by the service provider computer 106.

The operations of the Medicare eligibility module 180 and/or the data storage devices 182 are described in greater detail below with reference to FIGS. 3-4.

With continued reference to the service provider computer 106, the one or more I/O interfaces 144 may facilitate communication between the service provider computer 106 and one or more input/output devices, for example, one or more user interface devices, such as a display, keypad, control panel, touch screen display, remote control, microphone, etc., that facilitate user interaction with the service provider computer 106. The one or more network interfaces 146 may facilitate connection of the service provider computer 106 to one or more suitable networks, for example, the network 110 illustrated in FIG. 1. In this regard, the service provider computer 106 may communicate with other components of the system 100.

With continued reference to FIG. 1, the claims processor computer 108 may be any suitable processor-driven device that facilitates receiving, processing, and/or fulfilling healthcare claim transactions and/or healthcare claim requests received from the service provider computer 106. For example, the claims processor computer 108 may be a processor-driven device associated with a pharmacy benefits manager (PBM), an insurer, a Medicare payor, another government payor, or a claims clearinghouse. As desired, the claims processor computer 108 may include any number of special purpose computers or other particular machines, application specific circuits, microcontrollers, personal computers, minicomputers, mainframe computers, servers, and the like. In certain embodiments, the operations of the claims processor computer 108 may be controlled by computer-executed or computer-implemented instructions that are executed by one or more processors associated with the claims processor computer 108 to form a special purpose computer or other particular machine that is operable to facilitate the receipt, processing, and/or fulfillment of healthcare claim transaction requests received from the service provider computer 106. The one or more processors that control the operations of the claims processor computer 108 may be incorporated into the claims processor computer 108 and/or in communication with the claims processor computer 108 via one or more suitable networks. In certain embodiments of the invention, the operations and/or control of the claims processor computer 108 may be distributed amongst several processing components.

Similar to other components of the system 100, the claims processor computer 108 may include one or more processors 158, one or more memory devices 160, one or more input/output ("I/O") interface(s) 162, and one or more network interfaces 164. The one or more memory devices 160 may be any suitable memory devices, for example, caches, read only memory devices, random access memory devices, magnetic storage devices, removable memory devices, etc. The one or more memory devices 160 may store data, executable instructions, and/or various program modules utilized by the claims processor computer 108, for example, data files 166, an operating system ("OS") 168, a database management system ("DBMS") 170, and a host module 172. The data files 166 may include any suitable information that is utilized by the claims processor computer 108 to process healthcare claim transactions, for example, patient profiles, patient insurance information, other information associated with a patient, information associated with a healthcare provider, etc. The operating system (OS) 168 may be a suitable software module that controls the general operation of the claims processor computer 108. The OS 168 may also facilitate the execution of other software modules by the one or more processors 158, for example, the DBMS 170 and/or the host module 172. The OS 168 may be, but is not limited to, Microsoft Windows®, Apple OSX™, Linux, Unix, or a mainframe operating system. The DBMS 170 may be a suitable software module that facilitates access and management of one or more databases that are utilized to store information that is utilized by the claims processor computer 108 in various embodiments of the invention. The host module 172 may initiate, receive, process, and/or respond to requests, such as healthcare claim transactions or claim requests, from the host module 154 of the service provider computer 106. The claims processor computer 108 may include additional program modules for performing other pre-processing or post-processing methods described herein. Those of ordinary skill in the art will appreciate that the claims processor computer 108 may include alternate and/or additional components, hardware, or software without departing from example embodiments of the invention.

The one or more I/O interfaces 162 may facilitate communication between the claims processor computer 108 and one or more input/output devices, for example, one or more user interface devices, such as a display, keypad, control panel, touch screen display, remote control, microphone, etc., that facilitate user interaction with the claims processor computer 108. The one or more network interfaces 164 may facilitate connection of the claims processor computer 108 to one or more suitable networks, for example, the network 110 illustrated in FIG. 1. In this regard, the claims processor computer 108 may receive healthcare claim transactions and/or other communications from the service provider computer 106, and the claims processor computer 108 may communicate information associated with processing claim transactions to the service provider.

The Medicare TrOOP facilitator 190 may be one or more computers that maintain or facilitate the maintenance of one or more Medicare eligibility files, such as a Medicare Part B eligibility file. The Medicare TrOOP facilitator 190 may include similar components as other devices included in the system 100, such as the service provider computer 106. For example, the Medicare TrOOP facilitator 190 may be a processor-driven device that includes at least one memory, at least one processor, one or more I/O interfaces and/or one or more network interfaces. The Medicare TrOOP facilitator 190 may further include software and/or computer executable instructions that may be executed by the at least one processor to maintain and/or update one or more Medicare eligibility files, and/or to process requests or E1 transactions associated with Medicare eligibility. Additionally, one or more Medicare eligibility files that are maintained by the Medicare TrOOP facilitator 190 may be updated in a periodic manner by the Centers for Medicare and Medicaid Services (CMS). For example, eligibility files may be updated daily or multiple times a day. In certain embodiments, update information may be received from a system associated with the CMS in a communication that is pushed from the CMS system. In other embodiments, update information may be received from a system associated with the CMS in a pull manner in response to a request that is communicated to the CMS system.

Medicare Part B may cover a wide variety of products and/or services. For example, Medicare Part B coverage may include coverage for physician and nursing services, x-rays, laboratory and diagnostic tests, influenza and pneumonia vaccinations, blood transfusions, renal dialysis, certain outpatient hospital procedures, limited ambulance transportation, immunosuppressive drugs for organ transplant recipients, chemotherapy, certain hormonal treatments, and certain other outpatient medical treatments administered in a doctor's office. Medicare Part B may also assists with certain durable medical equipment (DME), such as canes, walkers, wheelchairs, and mobility scooters. Prosthetic devices such as artificial limbs and breast prosthesis following mastectomy, as well as eyeglasses following cataract surgery may also be covered.

The healthcare provider back office computer 195 may be one or more computers associated with a group of healthcare providers, such as a chain of pharmacies. The healthcare provider back office computer 195 may include similar components as other devices included in the system 100, such as the healthcare provider computer 104. For example, the healthcare provider back office computer 195 may be a processor-driven device that includes at least one memory, at least one processor, one or more I/O interfaces and/or one or more network interfaces. The healthcare provider back office computer 195 may further include software and/or computer-executable instructions that may be executed by the at least one processor to receive reports and/or billing information associated with the processing of healthcare claim transactions by the Medicare eligibility module 180. Additionally, as desired, the healthcare provider back office computer 195 may be operable or configured to provide various rules, parameters, and/or preferences associated with processing healthcare claim transactions to the service provider computer 106 and/or the Medicare eligibility module 180.

The network 110 may include any telecommunication and/or data network, whether public, private, or a combination thereof, including a local area network, a wide area network, an intranet, the Internet, intermediate handheld data transfer devices, and/or any combination thereof and may be wired and/or wireless. The network 110 may also allow for real-time, off-line, and/or batch transactions to be transmitted between or among the healthcare provider computer 104, the service provider computer 106, and the claims processor computer 108. Due to network connectivity, various methodologies as described herein may be practiced in the context of distributed computing environments. Although the service provider computer 106 is shown for simplicity as being in communication with the healthcare provider computer 104 or the claims processor computer 108 via one intervening network 110, it is to be understood that any other network configuration is possible. For example, intervening network 110 may include a plurality of networks, each with devices such as gateways and routers for providing connectivity between or among networks 110. Instead of or in addition to a network 110, dedicated communication links may be used to connect the various devices in accordance with an example embodiment of the invention. For example, the service provider computer 106 may form the basis of network 110 that interconnects the healthcare provider computer 104 and the claims processor computer 108.

Those of ordinary skill in the art will appreciate that the system 100 shown in and described with respect to FIG. 1 is provided by way of example only. Numerous other operating environments, system architectures, and device configurations are possible. Other system embodiments can include fewer or greater numbers of components and may incorporate some or all of the functionality described with respect to the system components shown in FIG. 1. For example, in one embodiment, the service provider computer 106 (or other computer) may be implemented as a specialized processing machine that includes hardware and/or software for performing the methods described herein. In addition, at least a portion of the processor and/or processing capabilities of the service provider computer 106 and/or the Medicare eligibility module 180 may be implemented as part of the claims processor computer 108. Accordingly, embodiments of the invention should not be construed as being limited to any particular operating environment, system architecture, or device configuration.

Operational Overview

Figure 2A:
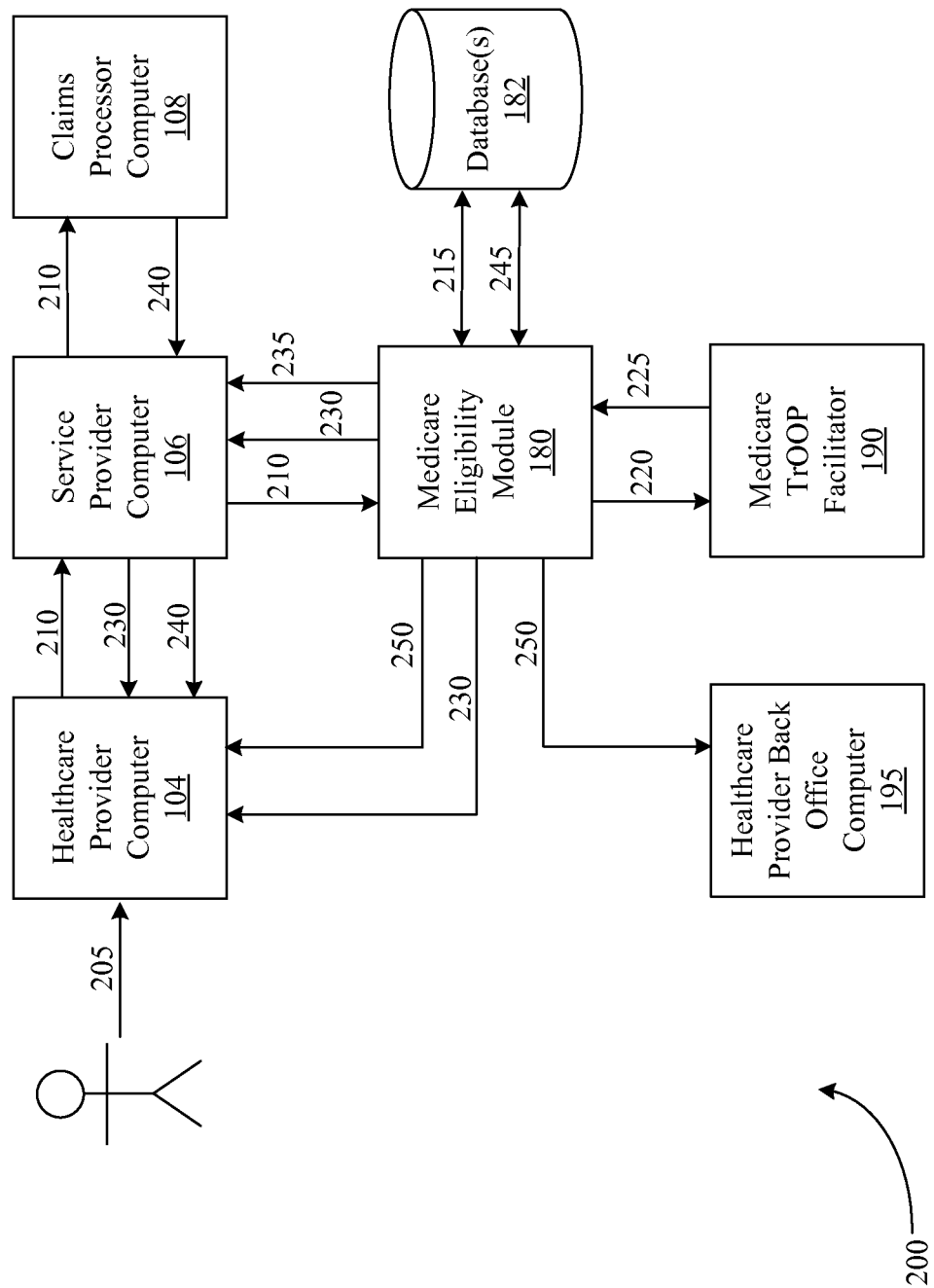
FIGS. 2A-2B are diagrams of example data flows for evaluating the Medicare eligibility of healthcare claim transactions that are processed through a service provider, according to illustrative embodiments of the invention.

FIG. 2A is a diagram of one example data flow 200 for evaluating the Medicare eligibility of healthcare claim transactions that are processed through a service provider, such as the service provider computer 106 illustrated in FIG. 1. With reference to FIG. 2A, a healthcare provider computer, such as the healthcare provider computer 104 illustrated in FIG. 1, may receive a healthcare request 205 from a patient, such as a healthcare request 205 for a prescription drug, nonprescription drug, other product, or service. The healthcare request 205 may be received in-person or electronically as desired in various embodiments of the invention. For example, a patient may request a medication product at a pharmacy or physician's offices. As another example, a patient may communicate a healthcare request 205 to a healthcare provider computer 104 via one or more suitable network connections. For example, a purchase request for a product may be communicated to a healthcare provider computer 104 from a customer computer via a web portal hosted by the healthcare provider computer 104.

The healthcare provider computer 104 may receive and process the healthcare request 205 to generate a healthcare claim transaction 210, such as a healthcare claim request or a prescription claim request, and the healthcare claim transaction 210 may be communicated by the healthcare provider computer 104 to the service provider computer 106. According to an example embodiment of the invention, the healthcare claim transaction 210 may be in accordance with a version of a National Council for Prescription Drug Programs (NCPDP) Telecommunication Standard, although other standards may be utilized as well. As desired, the healthcare claim transaction 210 may include a Banking Identification Number (BIN) and/or a Processor Control Number (PCN) for identifying a particular claims processor computer or payor, such as the claims processor computer 108 illustrated in FIG. 1, as a destination for the healthcare claim transaction 210. In addition, the healthcare claim transaction 210 may also include information relating to the patient, payor, prescriber, healthcare provider, and/or the prescribed or administered drug, product, or service. As an example, the healthcare claim transaction 210 received by the service provider computer 106 may include one or more of the following information:

Payor ID/Routing Information
BIN Number (i.e. Banking Identification Number) and/or Processor Control Number (PCN) that designates a destination of the healthcare claim transaction 210
Patient Information
Name (e.g., Patient Last Name, Patient First Name, etc.)
Date of Birth of Patient
Age of Patient
Gender
Patient Address (e.g., Street Address, Zip Code, etc.)
Patient Contact Information (e.g., Patient Telephone Number, email address, etc.)
Patient ID or other identifier
Insurance/Coverage Information
Cardholder Name (e.g., Cardholder First Name, Cardholder Last Name)
Cardholder ID and/or other identifier (e.g., person code)
Group ID and/or Group Information
State Payor Information
Prescriber Information
Primary Care Provider ID or other identifier (e.g., NPI code)

Primary Care Provider Name (e.g., Last Name, First Name)
Prescriber ID or other identifier (e.g., NPI code, DEA number)
Prescriber Name (e.g., Last Name, First Name)
Prescriber Contact Information (e.g., Telephone Number)
Pharmacy or other Healthcare Provider Information (e.g., store name, chain identifier, etc.)
Pharmacy or other Healthcare Provider ID (e.g., National Provider Identifier (NPI) code)
Claim Information
Drug or product information (e.g., National Drug Code (NDC))
Prescription/Service Reference Number
Date Prescription Written
Quantity Dispensed
Number of Days Supply
Diagnosis/Condition
Pricing information for the drug or product (e.g., network price, Usual & Customary price)
One or more NCPDP Message Fields
One or more Drug Utilization Review (DUR) Codes
Date of Service.

With continued reference to FIG. 2A, the service provider computer 106 may receive the healthcare claim transaction 210 from the healthcare provider computer 104, and the service provider computer 106 may process the healthcare claim transaction 210. As desired, the service provider computer 106 may perform one or more pre-edits on the healthcare claim transaction 210. The pre-edits may verify, add, and/or edit information included in the healthcare claim transaction 210 prior to the healthcare claim transaction 210 being communicated to an appropriate claims processor computer 108. In certain embodiments, a determination may be made as to whether a Medicare eligibility edit or service is enabled for the healthcare claim transaction 210. For example, a determination may be made as to whether a healthcare provider or group of healthcare providers associated with the healthcare claim transaction 210 has enabled or activated a Medicare eligibility edit for use in processing healthcare claim transactions that are routed or otherwise communicated through the service provider computer 106.

If a Medicare eligibility edit is not enabled for processing the healthcare claim transaction 210 and no rejections are triggered or generated by any other pre-edits performed for the healthcare claim transaction 210, then the healthcare claim transaction 210 and/or a copy thereof may be routed or otherwise communicated by the service provider computer 106 to an appropriate claims processor computer 108 associated with a designated payor for adjudication. According to an example embodiment, the service provider computer 106 may utilize at least a portion of the information included in the healthcare claim transaction 210, such as a BIN/PCN, to determine the appropriate claims processor computer 108 to route the healthcare claim transaction 210 to. The service provider computer 106 may also include a routing table, perhaps stored in memory, for determining which claims processor computer 108 to route the healthcare claim transaction 210 to.

If a Medicare eligibility edit is enabled for processing the healthcare claim transaction 210, then the healthcare claim transaction 210, a copy of the healthcare claim transaction 210, and/or information included in the healthcare claim transaction 210 may be communicated to a suitable Medicare eligibility module, such as the Medicare eligibility module 180 shown in FIG. 1, for processing. The Medicare eligibility module 180 may receive the healthcare claim transaction 210 and the Medicare eligibility module 180 may determine whether a designated payor is a Medicare payor, such as a Medicare Part B payor. If the designated payor is a Medicare payor, then the Medicare eligibility module 180 may mark the healthcare claim transaction 210 as suitable for communication to the claims processor computer 108. Alternatively, as desired, the Medicare eligibility module 180 may further process the healthcare claim transaction 210 in order to determine whether a patient associated with the healthcare claim transaction 210 is eligible for Medicare coverage prior to marking the healthcare claim transaction 210 as suitable or approved for communication to the claims processor computer 108. If the designated payor is not a Medicare payor, then the Medicare eligibility module 180 may further process the healthcare claim transaction 210 in order to determine whether Medicare coverage is available or potentially available. As an alternative to the Medicare eligibility module 180 evaluating the designated payor for the healthcare claim transaction 210, the designated payor may be evaluated prior to invoking the Medicare eligibility module 180, and the Medicare eligibility module 180 may be invoked if the designated payor is determined to be a payor other than a Medicare payor.

The Medicare eligibility module 180 may identify or determine one or more products or services included in or associated with the healthcare claim transaction 210. For example, the Medicare eligibility module 180 may identify one or more NDC, UPC, or other product identifiers (e.g., product names, etc.) included in the healthcare claim transaction 210 in order to identify one or more products or services. Once a product or service is identified, the Medicare eligibility module 180 may determine whether the identified product or service is eligible for Medicare Part B coverage. For example, the Medicare eligibility module 180 may access stored information 215 associated with products and/or services (e.g., product identifiers) that are eligible for Medicare Part B coverage, and the Medicare eligibility module 180 may compare at least a portion of the accessed information 215 to the product identifiers included in the healthcare claim transaction 210. A product or service may be identified as Medicare eligible if a match is found during the comparison. If the identified product or service is not Medicare eligible, then the Medicare eligibility module 180 may mark the healthcare claim transaction 210 as an approved or acceptable transaction to facilitate routing or communication of the healthcare claim transaction 210 to the claims processor computer 108 by the service provider computer 106. As desired, the Medicare eligibility module 180 may communicate a message 235 indicating that the healthcare claim transaction 210 is acceptable to the service provider computer 106, and the service provider computer 106 may route the healthcare claim transaction 210 and/or perform additional processing on the healthcare claim transaction 210 based upon the receipt of the message 235.

If, however, the identified product or service is Medicare eligible, then the Medicare eligibility module 180 may determine whether a patient associated with the healthcare claim transaction 210 is eligible to receive Medicare Part B coverage. In order to facilitate the determination, patient identifying information (e.g., a patient name, address, identifier, etc.) included in the healthcare claim transaction 210 may be compared to information included in a Medicare Part B eligibility file. As desired, the patient identifying information included in the healthcare claim transaction 210 may be normalized prior to a comparison. In certain embodiments, the Medicare eligibility module 180 may access the Medicare eligibility file and perform a comparison. In other embodiments, the Medicare eligibility module 180 may generate a Medicare eligibility request 220 or Medicare eligibility transaction utilizing patient identifying information included in the healthcare claim transaction 210. The eligibility request 220 may then be communicated to a suitable Medicare eligibility facilitator, such as the TrOOP facilitator 190 illustrated in FIG. 1. The TrOOP facilitator 190 may receive the eligibility request 220 and compare patient identifying information included in the eligibility request 220 to information stored in a Medicare eligibility file maintained by the TrOOP facilitator 190. The TrOOP facilitator 190 may then generate or prepare a reply 225 to the request eligibility 220, and the generated reply 225 may include an indication of whether or not the patient is eligible to receive Medicare Part B benefits. The TrOOP facilitator 190 may communicate the generated reply 225 to the Medicare eligibility module 180, and the Medicare eligibility module 180 may analyze or evaluate the received reply 225 in order to determine whether the patient is eligible to receive Medicare Part B coverage.

As desired, the information 215 accessed by the Medicare eligibility module 180 may include information associated with one or more rules, parameters, and/or preferences for processing the healthcare claim transaction 210, such as rules associated with the healthcare provider computer 104, the healthcare provider, and/or a group of healthcare providers (e.g., a pharmacy chain). A wide variety of rules may be accessed as desired in various embodiments including but not limited to, rules for determining Medicare eligibility, rules associated with products and/or services that are immune from a Medicare eligibility determination, rules associated with generating rejections for the healthcare claim transaction 210, and/or rules associated with altering or modifying the healthcare claim transaction 210. In certain embodiments, a time period or time threshold for communicating the eligibility request 220 to the TrOOP facilitator 190 may be accessed. Alternatively, a default time threshold may be utilized. A time threshold may set forth a period of time or timing window in which a reply 225 should be received from the TrOOP facilitator 190. If a reply 225 is not received before the threshold is reached, then other rules may be utilized to determine the further processing of the healthcare claim transaction 210. More specifically, other rules may be utilized in order to determine whether the healthcare claim transaction 210 should be marked as acceptable or rejected by the Medicare eligibility module 180. As an alternative to accessing healthcare provider rules for evaluating or processing the healthcare claim transaction 210, the Medicare eligibility module 180 may access and utilize default rules to evaluate the healthcare claim transaction 210.

If the Medicare eligibility module 180 determines that the patient is not eligible to receive Medicare Part B benefits or coverage, then the Medicare eligibility module 180 may mark the healthcare claim transaction 210 as an approved or acceptable transaction to facilitate routing or communication of the healthcare claim transaction 210 to the claims processor computer 108 by the service provider computer 106. In other words, the healthcare claim transaction 210 may be communicated to an appropriate claims processor computer 108 associated with a payor designated by the healthcare claim transaction 210. As desired, the Medicare eligibility module 180 may communicate a message 235 indicating that the healthcare claim transaction 210 is acceptable to the service provider computer 106, and the service provider computer 106 may route the healthcare claim transaction 210 and/or perform additional processing on the healthcare claim transaction 210 based upon the receipt of the message 235.

However, if the Medicare eligibility module 180 determines that the patient is eligible to receive Medicare Part B coverage for the healthcare claim transaction 210, then the Medicare eligibility module 180 may generate one or more suitable messages 230 indicating a rejection of the healthcare claim transaction 210. As desired, a message 230 may include one or more reasons for rejecting the healthcare claim transaction 210, for example, an indication that the designated payor for the healthcare claim transaction 210 should be a Medicare Part B payor. As desired, the message 230 may include Medicare Part B coverage information for the patient. Additionally, in certain embodiments, the message 230 may include an instruction or invitation to resubmit the healthcare claim transaction 210 with the payor designated to be Medicare Part B. In certain embodiments, override information, such as an override code, may also be generated for the edits and/or processing performed by the Medicare eligibility module 180, and the generated override information may be included in the message 230 along with an indication that the override information may be utilized to override or suppress the processing of the Medicare eligibility module 180 during a resubmission of the healthcare claim transaction 210. As desired, during a resubmission of the healthcare claim transaction 210, a healthcare provider may utilize the override information to suppress the generation of a rejection by the Medicare eligibility module 180 and cause the healthcare claim transaction 210 to be routed to the claims processor computer 108.

The generated message 230 may be communicated to the healthcare provider computer 104 by the Medicare eligibility module 180 or at the direction of the Medicare eligibility module 180. For example, the Medicare eligibility module 180 may communicate the generated message 230 to the service provider computer 106, and the service provider computer 106 may communicate the message 230 to the healthcare provider computer 104.

As an alternative to generating and communicating a rejection message 230 when it is determined that the patient is eligible to receive Medicare Part B coverage, the Medicare eligibility module 180 may alter or update the designated payor for the healthcare claim transaction 210 to a Medicare Part B payor. The Medicare eligibility module 180 may then mark the updated healthcare claim transaction 210 as acceptable for routing to a claims processor computer 108 associated with a Medicare Part B payor, and the service provider computer 106 may route or otherwise communicate the updated healthcare claim transaction 210 to the appropriate claims processor computer 108. Additionally, as desired, the Medicare eligibility module 180 may generate a message indicating that the payor has been changed to a Medicare Part B payor, and the Medicare eligibility module 180 may communicate or direct the communication of the generated message to the healthcare provider computer 104 and/or a healthcare provider back office computer, such as the healthcare provider back office computer 195 illustrated in FIG. 1. In this regard, the healthcare provider may update its claim to reflect the claim that was submitted to the Medicare Part B payor.

In embodiments where the healthcare claim transaction 210 is routed or otherwise communicated to a claims processor computer 108, the claims processor computer 108 may receive and adjudicate or otherwise process the healthcare claim transaction 210. For example, the claims processor computer 108 may determine benefits coverage for the healthcare claim transaction 210 according to an adjudication process associated with eligibility, pricing, and/or utilization review. The claims processor computer 108 may transmit an adjudicated reply 240 or response for the healthcare claim transaction 210 to the service provider computer 106. The service provider computer 106 may receive the adjudicated reply 240 from the claims processor computer 108. As desired, the service provider computer 106 may perform any number of post-edits on the adjudicated reply 240. The adjudicated reply 240 may then by routed or otherwise communicated by the service provider computer 106 to the healthcare provider computer 104.

According to an aspect of the invention, the Medicare eligibility module 180 may store information 245 associated with the processed healthcare claim transaction 210 for reporting and/or billing purposes. A wide variety of information 245 may be stored as desired in various embodiments of the invention, for example, a copy of the healthcare claim transaction 210, information extracted from the healthcare claim transaction 210, information associated with the processing of the Medicare eligibility module 180, information associated with generated or triggered rejections, information associated with alteration or updates made to the healthcare claim transaction 210, etc. In certain embodiments, information associated with the invocation of the Medicare eligibility module 180 may be communicated to an appropriate billing system associated with the service provider computer 106 in order to facilitate billing customers, such as healthcare providers, for the services provided by the Medicare eligibility module 180. Alternatively, the Medicare eligibility module 180 may alter a billing code or other field of the healthcare claim transaction 210 to a value indicating that the healthcare claim transaction 210 has been evaluated or processed by the Medicare eligibility module 180. The altered billing code may be recognized during subsequent or further processing of the healthcare claim transaction 210, such as further processing by the service provider computer 106, in order to facilitate billing.

According to another aspect of the invention, the Medicare eligibility module 180 or a reporting system associated with the Medicare eligibility module 180 and/or service provider computer 106 may utilize at least a portion of stored information 245 to generate one or more reports 250 that include information associated with the processing of the healthcare claim transactions 210. The generation of reports 250 is discussed in greater detail above with respect to FIG. 1. As desired, generated reports 250 may be communicated to customers of the service provider or to customer systems and/or devices, for example, the healthcare provider computer 104 and/or to the healthcare provider back office computer 195. A wide variety of suitable communications techniques, for example, electronic mail, short message service (SMS) messaging, other electronic communications, snail mail, etc., may be utilized as desired to communicate generated reports 250 to one or more recipients.

Figure 2B:
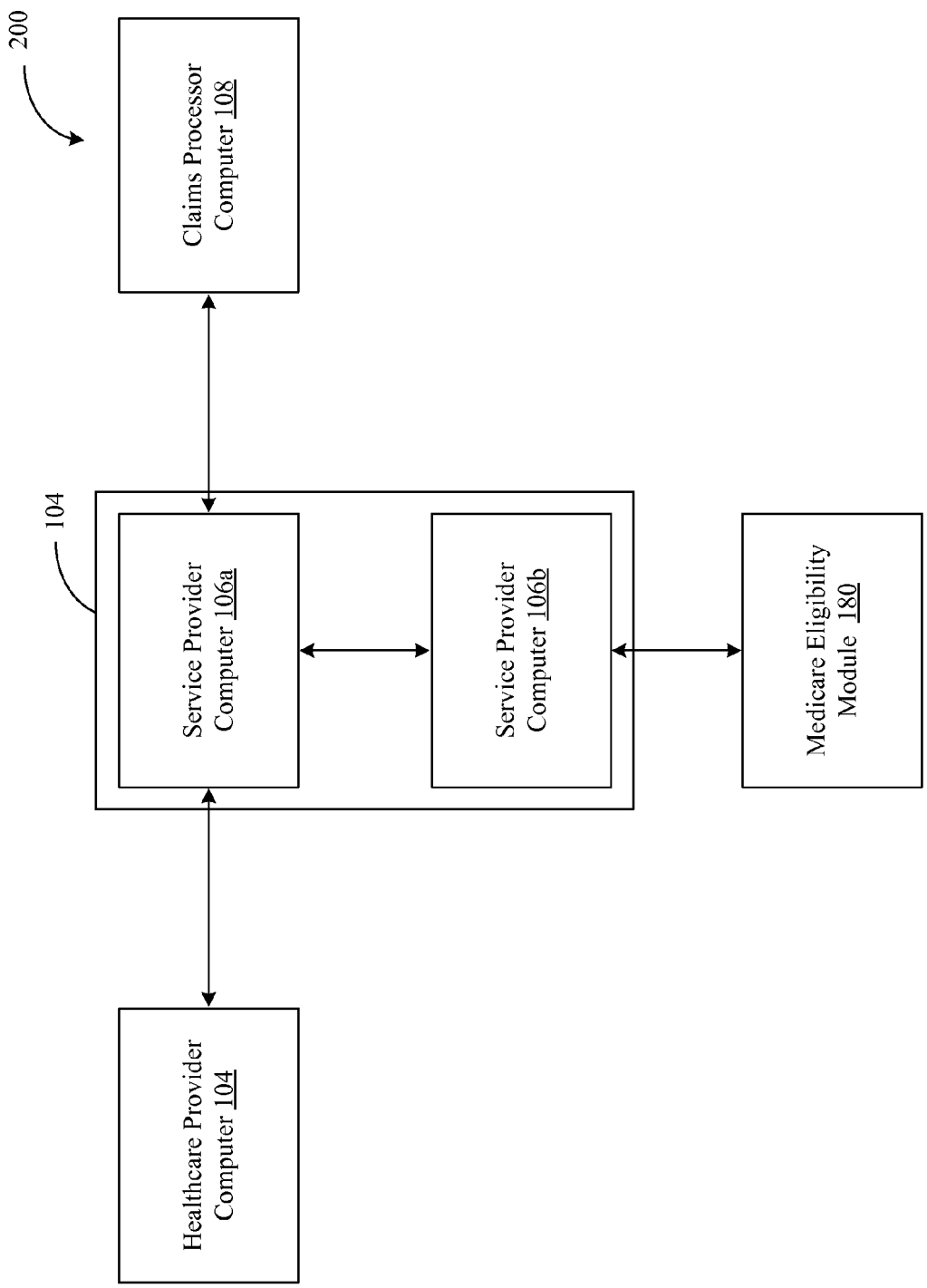

It will be appreciated that variations of the data flow 200 illustrated in FIG. 2A may be utilized in accordance with various embodiments of the invention. For example, as shown in FIG. 2B, the service provider computer 106 may be comprised of two or more distinct service provider computers 106a and 106b that are in communication with each other. Service provider computer 106a may be operative with one or more healthcare provider computers and claims processor computers, such as the healthcare provider computer 104 and claims processor computer 108 illustrated in FIG. 1. However, service provider computer 106b may have a data processing arrangement with service provider computer 106a. Under the data processing agreement, the service provider computer 106a may be permitted to utilize or offer services of the service provider computer 106b, including those of the Medicare eligibility module 180. For example, a first service provider may communicate claims and/or other information to a second service provider for processing.

As described herein, healthcare transactions may be examined as they are routed to or through a service provider computer 106. In this regard, a Medicare eligibility evaluation service may be provided in real time or near real time as the healthcare transactions are routed to or through the service provider computer 106. FIG. 3 is a flow chart of an example method 300 for processing a healthcare claim transaction in order to evaluate Medicare Part B eligibility, according to an example embodiment of the invention. The method 300 may be performed by a suitable service provider computer and/or an associated Medicare eligibility module, such as the service provider computer 106 and Medicare eligibility module 180 illustrated in FIG. 1. The method 300 may begin at block 305.

At block 305, a healthcare claim transaction may be received from a healthcare provider computer, such as the healthcare provider computer 104 shown in FIG. 1. One or more pre-edits and/or evaluations may be performed on the received healthcare claim transaction as desired in various embodiments of the invention. For example, one or more pre-edits may be performed by a PPE module associated with the service provider computer 106, such as the PPE module 156 shown in FIG. 1. In certain embodiments, a pre-edit or other evaluation, such as an evaluation of processing rules may determine at block 310 whether or not a Medicare eligibility edit is enabled or activated for the healthcare claim transaction. For example, rules or preferences associated with processing healthcare claim transactions received from the healthcare provider computer 104 may be analyzed in order to determine whether a Medicare eligibility edit is enabled. If it is determined at block 310 that a Medicare eligibility edit is not enabled, then operations may continue at block 325, and the healthcare claim transaction may be routed or otherwise communicated to an appropriate claims processor computer, such as the claims processor computer 108 illustrated in FIG. 1, for adjudication. An adjudicated reply or response may then be received from the claims processor computer 108 and processed for routing or other communication to the healthcare provider computer 104. If, however, it is determined at block 310 that a Medicare eligibility edit is enabled, then operations may continue at block 315.

At block 315, the healthcare claim transaction may be processed by the Medicare eligibility module 180 or Medicare eligibility application. The Medicare eligibility module 180 may identify products and/or services included in or otherwise associated with the healthcare claim transaction, and the Medicare eligibility module 180 may determine whether the identified products or services are eligible for Medicare Part B coverage. If an identified product or service is eligible for Medicare Part B coverage, then the Medicare eligibility module 180 may determine whether a patient associated with the healthcare claim transaction is eligible to receive Medicare Part B coverage. One example of the operations that may be performed by the Medicare eligibility module 180 in order to evaluate or process the healthcare claim transaction is described in greater detail below with reference to FIG. 4.

At block 320, a determination may be made as to whether the claim has been rejected by the Medicare eligibility module 180. For example, a determination may be made as to whether the processing or evaluation by the Medicare eligibility module 180 has triggered a rejection for the transaction. If it is determined at block 320 that the healthcare claim transaction has not been rejected by the Medicare eligibility module 180, then operations may continue at block 325. At block 325, the healthcare claim transaction may be routed or otherwise communicated to an appropriate claims processor computer 108. The claims processor computer 108 may process the received healthcare claim transaction and return an adjudicated reply or response to the service provider computer 106. The received adjudicated reply may be received and processed by the service provider computer 106. The adjudicated reply may then be routed or otherwise communicated to the healthcare provider computer 104. Operations may then either end or optionally continue at block 335.

If, however, it is determined at block 320 that the healthcare claim transaction has been rejected by the Medicare eligibility module 180, then operations may continue at block 330. At block 330, a rejection or error message indicating a rejection of the healthcare claim transaction based upon the processing of the Medicare eligibility module 180 may be communicated to the healthcare provider computer 104. In certain embodiments, the message may include an indication that the transaction has been rejected due to the designation of an improper payor and/or an instruction to resubmit the healthcare claim transaction with a Medicare Part B payor designated. As desired, the message may also include override information, such as an override code, that may be utilized by a healthcare provider to resubmit the healthcare claim transaction with the original payor designation and suppress the processing of the Medicare eligibility module 180 and/or the generation of rejections by the Medicare eligibility module 180. Operations may then continue at block 335.

At block 335, which may be optional in certain embodiments of the invention, information associated with the healthcare claim transaction and/or the invocation of the Medicare eligibility module 180 may be stored and/or communicated for billing and/or reporting purposes. A wide variety of information may be stored as desired in various embodiments of the invention, for example, a copy of the healthcare claim transaction, information extracted from the healthcare claim transaction, information associated with the processing of the Medicare eligibility module 180, information associated with generated or triggered rejections, etc. As desired in certain embodiments, billing information may be communicated to a suitable billing system associated with the service provider. In other embodiments, billing information may be stored for subsequent access by a billing system or for subsequent access by another component of the service provider for communication to the billing system. Billing information may be utilized by the billing system in order to charge customers of the service provider for the Medicare eligibility evaluation service provided by the Medicare eligibility module 180. A wide variety of different types of billing information may be stored and/or communicated as desired in various embodiments of the invention, for example, an identifier associated with the invocation of the Medicare eligibility module 180 or a billing code (e.g., a unique billing code) associated with the invocation of the Medicare eligibility module 180. As an alternative to storing or communicating billing information, the Medicare eligibility module 180 may set a billing code for the healthcare claim transaction to a unique billing code associated with the provided Medicare eligibility evaluation service. The unique billing code may be identified or recognized during subsequent processing of the healthcare claim transaction by either the billing system or a component of the service provider computer 106. The identified billing code may then be utilized by the billing system in the generation of bills for customers of the service provider.

At block 340, which may be optional in certain embodiments of the invention, one or more reports may be generated utilizing at least a portion of the stored information associated with the healthcare claim transaction. Reports may be generated by the Medicare eligibility module 180, the service provider computer 106, and/or a separate reporting module. A wide variety of different information may be included in a generated report including, but not limited to, information extracted from one or more healthcare claim transactions, information associated with rejections triggered by the Medicare eligibility module 180, invocation information associated with the Medicare eligibility module 180, invocation rate information for the Medicare eligibility module 180, financial information, billing information, etc. Additionally, generated reports may be formatted and/or sorted utilizing a wide variety of different parameters and/or criteria, such as identifiers for healthcare provider computers, identifiers for healthcare providers, identifiers of products and/or services associated with healthcare claim transactions, dates of service, etc. As desired, generated reports may be communicated to one or more recipients, such as the healthcare provider computer 104 and/or a healthcare provider back office computer, such as the healthcare provider back office computer 195 illustrated in FIG. 1.

The method 300 may end following either block 325 or 340.

FIG. 4 is a flow chart of an example method 400 for evaluating a healthcare claim transaction for Medicare Part B coverage, according to an example embodiment of the invention. The method 400 illustrated in FIG. 4 may be an example implementation of block 315 shown in FIG. 3. As such, the method 400 may be performed by a suitable service provider computer and/or Medicare eligibility module, such as the service provider computer 106 and/or Medicare eligibility module 180 illustrated in FIG. 1. The method 400 may begin at block 405.

At block 405, information associated with a healthcare claim transaction may be received, such as a copy of the healthcare claim transaction or information extracted from the healthcare claim transaction. At block 410, a product or service associated with the healthcare claim transaction may be identified or determined. For example, a product identifier for a drug or product may be identified, such as a product name, a National Drug Code (NDC) identifier or a Universal Product Code (UPC) identifier. If multiple products or services are associated with the healthcare claim transaction, each product or service may be respectively evaluated in a similar manner.

At block 415, a determination may be made as to whether the identified product or service is eligible for Medicare Part B coverage. For example, a product or service identifier may be compared to one or more pre-stored identifiers associated with products or services that are eligible for Medicare Part B coverage. If it is determined at block 415 that the identified product or service is not eligible for Medicare Part B coverage, then operations may continue at block 425, and the healthcare claim transaction may be marked as an acceptable healthcare claim transaction that may be routed or otherwise communicated to an appropriate claims processor computer, such as the claims processor computer 108 illustrated in FIG. 1. If, however, it is determined at block 415 that the identified product or service is eligible for Medicare Part B coverage, then operations may continue at block 420.

At block 420, which may be optional in certain embodiments of the invention, a determination may be made as to whether the designated payor for the healthcare claim transaction is a Medicare Part B payor or a Medicare Part B plan. If it is determined at block 420 that the designated payor is a Medicare Part B payor, then operations may continue at block 425, and the healthcare claim transaction may be marked as an acceptable healthcare claim transaction that may be routed or otherwise communicated to an appropriate claims processor computer 108. If, however, it is determined at block 420 that the designated payor is not a Medicare Part B payor, then operations may continue at block 430. As an alternative to performing the operations of block 420, an analysis of the designated payor may be performed prior to the invocation of the method 400, and the method 400 may be invoked when the payor is determined to be a payor other than a Medicare Part B payor.

At block 430, a claims processing timer may be initiated for timing the further processing of the healthcare claim transaction. For example, a claims processing timer may be utilized to establish a time window for communicating a Medicare eligibility request to a Medicare eligibility facilitator, such as the TrOOP facilitator 190 illustrated in FIG. 1, and receiving a response or reply to the request. In certain embodiments a timer may count down from a predetermined value. In other embodiments, a timer may count up from zero such that a value of the timer may be compared to a suitable timer threshold. A wide variety of initial timer values and/or timer thresholds may be utilized as desired in various embodiments of the invention. In certain embodiments, an initial timer value or timer threshold may be established utilizing preferences of a healthcare provider or group of healthcare providers.

At block 435, patient identifying information included in the healthcare claim transaction (e.g., a patient name, address, date of birth, patient identifier, etc.) may be utilized to generate a Medicare eligibility request or eligibility transaction (also referred to as an E1 transaction). In certain embodiments, the patient identifying information may be normalized, and the normalized information may be included in the generated request. The Medicare eligibility request may be a request to determine whether the patient associated with the healthcare claim transaction is eligible to receive Medicare Part B benefits or coverage. At block 440, the generated request may be communicated to the TrOOP facilitator 190. The TrOOP facilitator 190 may access one or more Medicare eligibility files and compare at least a portion of the accessed information to the patient identifying information included in the request in order to determine whether the patient is eligible to receive Medicare Part B benefits.

As an alternative to communicating a request to the TrOOP facilitator 190 or another Medicare eligibility facilitator, in certain embodiments of the invention, the Medicare eligibility module 180 and/or the service provider computer 106 may access a Medicare eligibility file in order to determine whether a patient is eligible for Medicare Part B coverage.

At block 445, a determination may be made as to whether a reply to the communicated request has been received from the TrOOP facilitator 190. If it is determined at block 445 that a reply has not been received, then operations may continue at block 450. At block 450, a determination may be made as to whether the timer has expired or whether a timer threshold has been reached. If it is determined that the timer has not expired, then operations may continue at block 445. If, however, it is determined at block 450 that the timer has expired, then operations may continue at block 455. At block 455, the healthcare claim transaction may be marked as a rejected transaction and a rejection message may be generated. The generated message may instruct the healthcare provider to check or determine whether the patient is eligible for Medicare Part B coverage and to resubmit the healthcare claim transaction following the determination. As desired, the generated message may also include generated override information, such as an override code, that may be utilized in conjunction with a resubmitted transaction to suppress a Medicare eligibility edit and/or any rejections triggered by the edit. In this regard, if communication cannot be established with the TrOOP facilitator 190, then the Medicare eligibility edit may be suppressed.

If, however, it is determined at block 445 that a reply has been received from the TrOOP facilitator 190, then operations may continue at block 460. At block 460, the reply may be analyzed and a determination may be made as to whether the patient is eligible for Medicare Part B coverage. If it is determined at block 460 that the patient is not eligible for Medicare Part B coverage, then operations may continue at block 425 and the healthcare claim transaction may be marked as an acceptable healthcare claim transaction that may be routed or otherwise communicated to an appropriate claims processor computer 108. If, however, it is determined at block 460 that the patient is eligible for Medicare Part B coverage, then operations may continue at block 465. At block 465, the healthcare claim transaction may be marked or identified as a rejected healthcare claim transaction. As desired, a suitable rejection message may be generated for communication to the healthcare provider computer 104. The generated rejection message may include an indication that the healthcare claim transaction has been rejected due to an improper payor designation and/or information associated with the Medicare Part B eligibility of the patient. Additionally, as desired, the message may include an invitation or instruction to resubmit the healthcare claim transaction with a Medicare payor designated as an appropriate payor. In this regard, improper payor designations that may lead to subsequent charge-backs may be reduced or avoided.

The method 400 may end following either block 425, 455, or 465.

Figure 3:
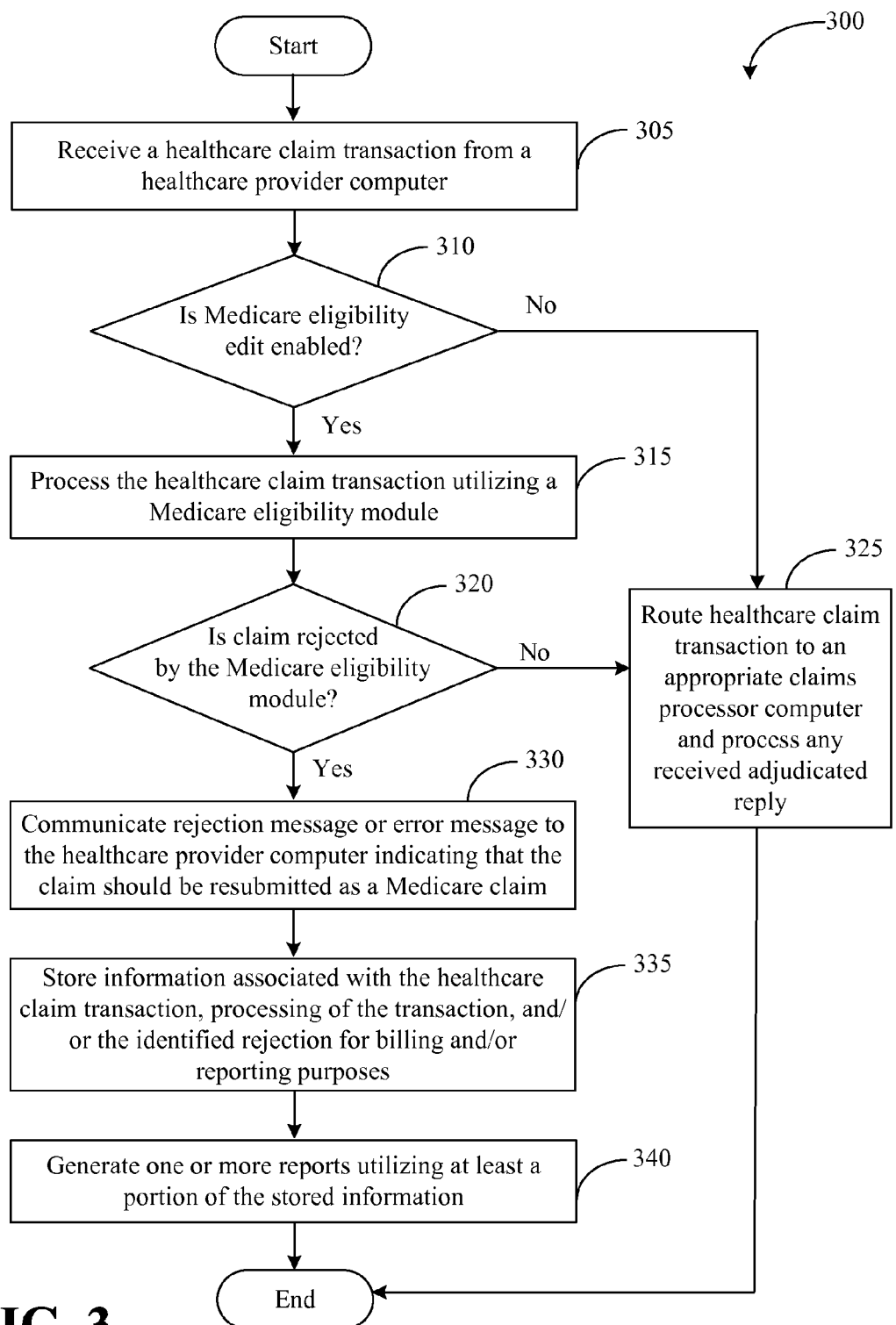
FIG. 3 is a flow chart of an example method for processing a healthcare claim transaction in order to evaluate Medicare eligibility, according to an illustrative embodiment of the invention.

The operations described and shown in the methods 300 and 400 of FIGS. 3-4 may be carried out or performed in any suitable order as desired in various embodiments of the invention. Additionally, in certain embodiments, at least a portion of the operations may be carried out in parallel. Furthermore, in certain embodiments, less than or more than the operations described in FIGS. 3-4 may be performed.

Although embodiments of the invention are described above with respect to Medicare Part B coverage, certain embodiments of the invention are equally applicable to other types of healthcare coverage and/or associated payors, such as other types of Medicare coverage, state payment plans, certain types of commercial coverage, etc.

Accordingly, example embodiments of the invention can provide the technical effects of creating a system, method, and apparatus that provides a Medicare eligibility evaluation and/or processing service to healthcare providers and/or groups of healthcare providers. In this regard, improper payor designations may be reduced or avoided during situations in which Medicare coverage is available for a healthcare claim transaction. Additionally, relatively expensive charge-backs for healthcare claim transactions that include improper payor designations may be reduced or avoided.

Various block and/or flow diagrams of systems, methods, apparatuses, and/or computer program products according to example embodiments of the invention are described above. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention.

These computer-executable program instructions may be loaded onto a special purpose computer or other particular machine, a processor, or other programmable data processing apparatus to produce a particular machine, such that the instructions that execute on the computer, processor, or other programmable data processing apparatus create means for implementing one or more functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special purpose hardware and computer instructions.

Many modifications and other embodiments of the invention set forth herein will be apparent having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A computer-implemented method, comprising:
   receiving, from a healthcare provider computer by a service provider system comprising one or more computers, a healthcare claim transaction for a patient, wherein the healthcare claim transaction is associated with a product or service and comprises payor information that designates a payor for the healthcare claim transaction that is not classified as a Medicare Part B payor;
   identifying, by the service provider system, that the product or service is eligible for Medicare Part B coverage;
   determining, by the service provider system and responsive to identifying that the product or service is eligible for Medicare Part B coverage, whether the patient is eligible for Medicare Part B coverage; and
   routing, by the service provider system, the healthcare claim transaction to a claims processor computer associated with the designated payor responsive to a determination that the patient is not eligible for Medicare Part B coverage, or
   communicating, by the service provider system to the healthcare provider computer and responsive to a determination that the patient is eligible for Medicare Part B coverage, a message indicating that the healthcare claim transaction is rejected, wherein the message comprises an indication that the healthcare claim transaction is rejected because the payor designated by the payor information is an improper payor for the healthcare claim transaction.

2. The computer-implemented method of claim 1, wherein determining whether the patient is eligible for Medicare Part B coverage comprises:
   determining whether identifying information for the patient is included in a Medicare Part B eligibility file.

3. The computer-implemented method of claim 1, further comprising:
   generating, by the service provider system, a request for a Medicare eligibility facilitator to determine whether the patient is eligible for Medicare Part B coverage; and
   communicating, by the service provider system, the generated request to the Medicare eligibility facilitator.

4. The computer-implemented method of claim 3, wherein generating a request comprises:
   identifying patient identification information included in the healthcare claim transaction; and
   generating the request utilizing at least a portion of the identified patient identification information.

5. The computer-implemented method of claim 3, further comprising:
   receiving, by the service provider system from the Medicare eligibility facilitator, a response to the request, wherein the response indicates whether the patient is eligible for Medicare Part B coverage, and
   wherein the determination of whether the patient is eligible for Medicare Part B coverage is based at least in part on the received response.

6. The computer-implemented method of claim 3, further comprising:
   initiating, by the service provider system prior to communicating the generated request, a timer that establishes a time period for receiving a response to the request;
   determining, by the service provider system, that the time period has expired; and
   designating, by the service provider system, the healthcare claim transaction as a rejected transaction, wherein the patient is potentially eligible for Medicare Part B coverage, and
   wherein the message comprises an instruction to determine whether the patient is eligible for Medicare Part B coverage.

7. The computer-implemented method of claim 6, wherein the message further comprises override information for overriding a Medicare Part B eligibility determination for a resubmission of the healthcare claim transaction.

8. The computer-implemented method of claim 1, wherein the message comprises Medicare Part B coverage information for the patient.

9. The method of claim 1, wherein the message further comprises an instruction to update the payor information to designate a payor classified as a Medicare Part B payor and to re-submit the healthcare claim transaction with the updated payor information.

10. A system, comprising:
   at least one memory storing computer-executable instructions; and at least one processor configured to access the at least one memory and to execute the computer-executable instructions to:
receive, from a healthcare provider computer, a healthcare claim transaction for a patient, wherein the healthcare claim transaction is associated with a product or service and comprises payor information that designates a payor for the healthcare claim transaction that is not classified as a Medicare Part B payor;
identify that the product or service is eligible for Medicare Part B coverage;
determine, responsive to identifying that the product or service is eligible for Medicare Part B coverage, whether the patient is eligible for Medicare Part B coverage; and
direct routing of the healthcare claim transaction to a claims processor computer associated with the designated payor responsive to a determination that the patient is not eligible for Medicare Part B coverage; or
direct, to the healthcare provider computer responsive to a determination that the patient is eligible for Medicare Part B coverage, a message indicating that the healthcare claim transaction is rejected, wherein the message comprises an indication that the healthcare claim transaction is rejected because the payor designated by the payor information is an improper payor for the healthcare claim transaction.

11. The system of claim 10, wherein the at least one processor is configured to determine whether the patient is eligible for Medicare Part B coverage by executing the computer-executable instructions to:
determine whether identifying information for the patient is included in a Medicare Part B eligibility file.

12. The system of claim 10, wherein the at least one processor is further configured to execute the computer-executable instructions to:
generate a request for a Medicare eligibility facilitator to determine whether the patient is eligible for Medicare Part B coverage; and
direct communication of the generated request to the Medicare eligibility facilitator.

13. The system of claim 12, wherein the at least one processor is configured to generate the request by executing the computer-executable instructions to:
identify patient identification information included in the healthcare claim transaction; and
generate the request utilizing at least a portion of the identified patient identification information.

14. The system of claim 12, wherein the at least one processor is further configured to execute the computer-executable instructions to:
receive, from the Medicare eligibility facilitator, a response to the request, wherein the response indicates whether the patient is eligible for Medicare Part B coverage, and
wherein the at least one processor is configured to determine whether the patient is eligible for Medicare Part B coverage based at least in part on the received response.

15. The system of claim 12, wherein the at least one processor is further configured to execute the computer-executable instructions to:
initiate, prior to communicating the generated request, a timer that establishes a time period for receiving a response to the request;
determine that the time period has expired; and
designate the healthcare claim transaction as a rejected transaction, wherein the patient is potentially eligible for Medicare Part B coverage, and
wherein the message comprises an instruction to determine whether the patient is eligible for Medicare Part B coverage.

16. The system of claim 15, wherein the message comprises override information for overriding a Medicare Part B eligibility determination for a resubmission of the healthcare claim transaction.

17. The system of claim 10, wherein the message comprises Medicare Part B coverage information for the patient.

18. The system of claim 10, wherein the message further comprises an instruction to update the payor information to designate a payor classified as a Medicare Part B payor and to re-submit the healthcare claim transaction with the updated payor information.

19. A method, comprising:
receiving, from a healthcare provider computer by a service provider system comprising one or more computers, a healthcare claim transaction associated with a patient and a product or service, wherein the healthcare claim transaction comprises payor information that designates a payor for the healthcare claim transaction that is not classified as a Medicare Part B payor;
identifying, by the service provider system, that the product or service is eligible for Medicare Part B coverage;
determining, by the service provider system and responsive to identifying that the product or service is eligible for Medicare Part B coverage, whether the patient is eligible for Medicare Part B coverage;
updating, by the service provider system, the payor information to designate an alternate payor responsive to a determination that the patient is eligible for Medicare Part B coverage, wherein the alternate payor is classified as a Medicare Part B payor; and
routing, by the service provider system, the healthcare claim transaction to a claims processor computer associated with the alternate payor.

20. The method of claim 19, further comprising:
communicating, by the service provider system to the healthcare provider computer or to a healthcare provider back office computer, a message indicating that the payor information was updated to designate the alternate payor.

* * * * *